United States Patent [19]
Blonder

[11] Patent Number: 6,071,165
[45] Date of Patent: Jun. 6, 2000

[54] THERMAL-POWERED DIVING DEVICE

[76] Inventor: Greg E. Blonder, 112 Mountain Ave., Summit, N.J. 07901

[21] Appl. No.: 09/031,282

[22] Filed: Feb. 26, 1998

Related U.S. Application Data

[60] Provisional application No. 60/044,585, Apr. 22, 1997.
[51] Int. Cl.[7] .......................... A63H 3/52; A63H 33/00; G09F 19/00; G09B 23/06
[52] U.S. Cl. ........................... 446/14; 446/267; 434/300; 40/406
[58] Field of Search .......................... 446/14, 267, 491; 434/276, 300, 302, 303, 365; 40/406, 409, 427

[56] References Cited

U.S. PATENT DOCUMENTS

| | | | |
|---|---|---|---|
| 1,454,426 | 5/1923 | Clements | 472/67 X |
| 1,796,566 | 3/1931 | Herbst | 472/67 |
| 2,182,570 | 12/1939 | Rosenblatt | 40/406 |
| 2,453,177 | 11/1948 | Abramson | 40/406 |
| 2,638,711 | 5/1953 | Tigrett | 40/406 |
| 3,387,396 | 6/1968 | Smith | 40/406 |
| 3,733,738 | 5/1973 | Kramer | 446/267 |
| 4,643,693 | 2/1987 | Rubinstein | 446/267 |
| 4,675,522 | 6/1987 | Weidinger et al. | 472/67 |

*Primary Examiner*—D Neal Muir
*Attorney, Agent, or Firm*—Mathews, Collins, Sherpherd & Gould, P.A.

[57] ABSTRACT

In accordance with the invention, a hollow, gas-containing diving body is disposed in a partially shaded transparent column partially-filled with a clear liquid. The diver is weighted for near-neutral buoyancy. The upper portion of the column is shaded, and the lower portion is subjected to thermal radiation such as sunlight. When radiation strikes the diver, it heats the gas, thereby increasing the gas volume, displacing liquid and increasing the buoyancy of the diver. The diver therefore rises to the shaded region where the gas cools, causing the diver to sink. The cycle repeats.

11 Claims, 9 Drawing Sheets

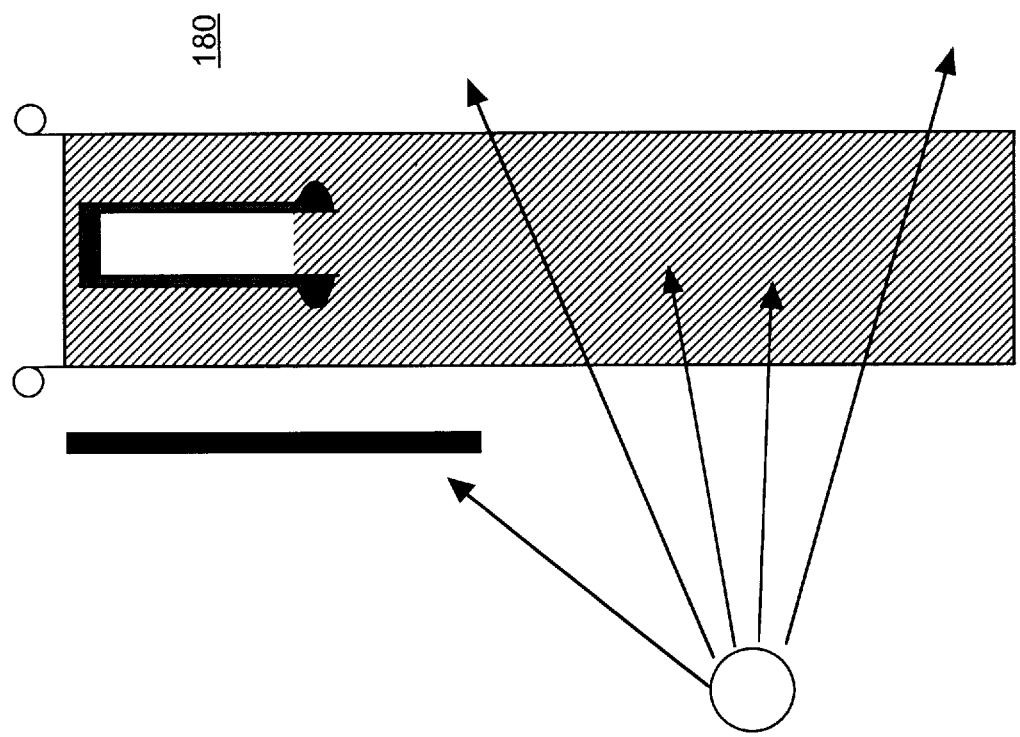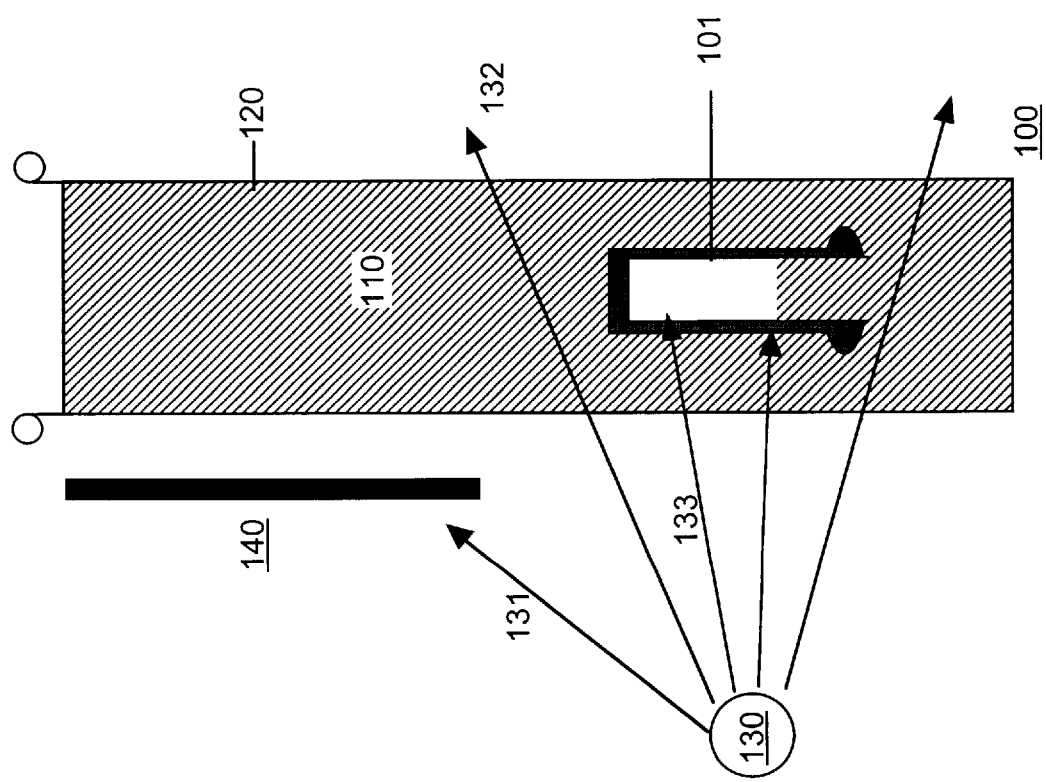

Inverted Diver

801

Diver In Normal Position

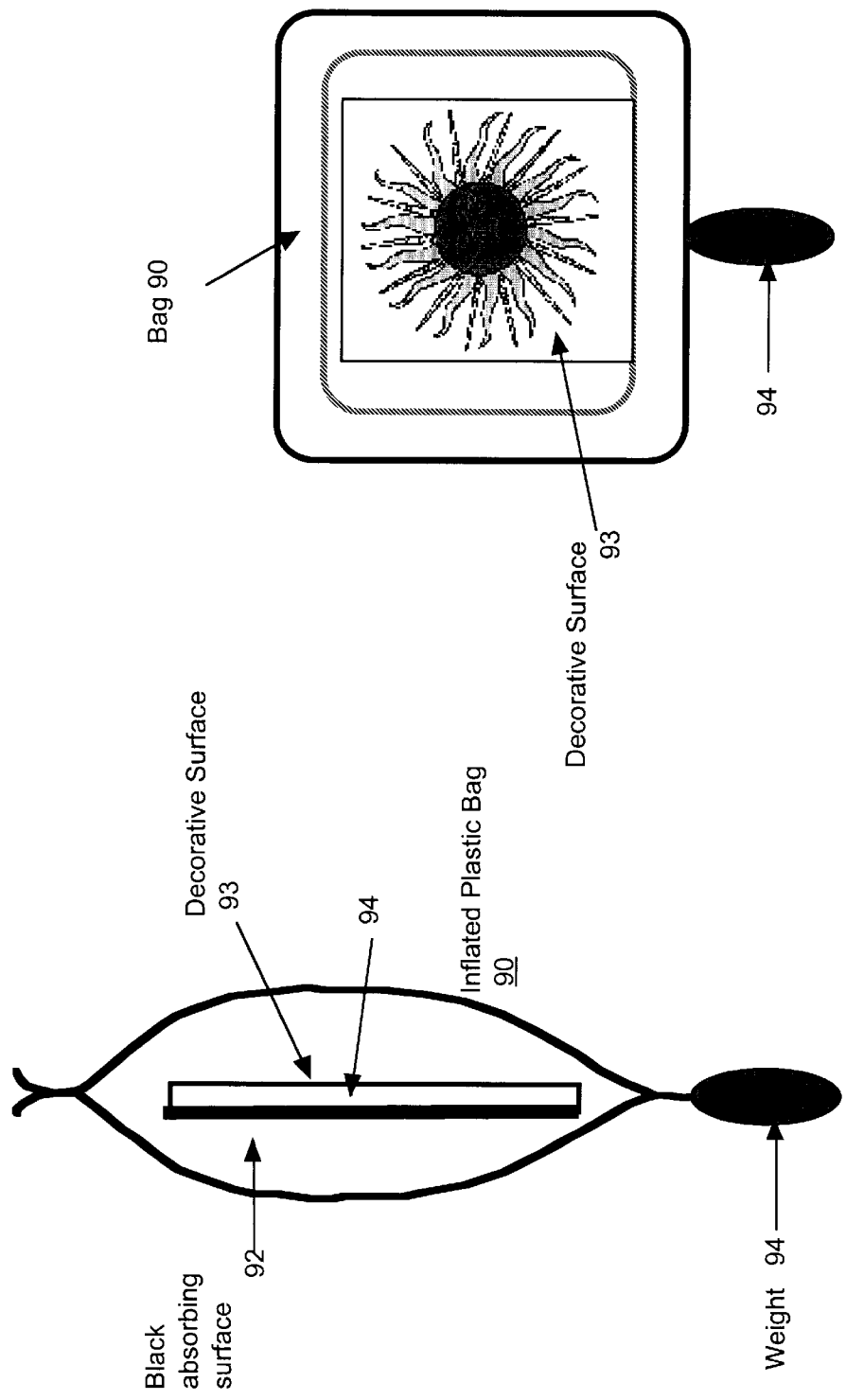

THERMAL-POWERED DIVING DEVICE

CROSS REFERENCES TO RELATED APPLICATIONS

This application claims the benefit of Provisional Application No. 60/044,585 entitled THERMAL-POWERED DIVING DEVICE filed by the applicant on Apr. 22, 1997.

FIELD OF THE INVENTION

This invention relates to thermal-powered diving devices particularly useful as decorative or teaching toys.

BACKGROUND OF THE INVENTION

A well-known diving toy called a "Cartesian diver" is essentially an inverted cup placed in a bath of water. A small weight is attached to the cup lip to achieve neutral buoyancy. The weight also ensures the center of mass is lower than the center of buoyancy, so the cup will not invert.

In operation, the diver sinks to a depth determined primarily by air pressure. If the air pressure above the liquid increases, this increased pressure is transmitted by the fluid to the air trapped inside the diver. The external pressure squeezes on the trapped air, reducing its volume. This reduces the buoyancy of the diver, and it sinks. As the diver sinks, pressure from the weight of the column of water above the diver increases, squeezing on the trapped air in the diver. Although the pressure increases linearly with depth, the air in the diver "stiffly" resists compression according to the ideal gas law. Eventually, it reaches a depth where the air pressure inside the diver is equal to the pressure in the water adjacent to the lip edge. The diver hovers at this depth. Similarly, if the external air pressure is reduced, the diver rises. Thus, one can think of the diver as a simple barometer.

The difficulty with the Cartesian diver as a toy to amuse or teach is its lack of dynamism. Atmospheric temperature changes but slowly so the diver also moves slowly. Accordingly there is a need for a more dynamic diving toy.

SUMMARY OF THE INVENTION

In accordance with the invention, a hollow, gas-containing diving body is disposed in a partially shaded transparent column partially-filled with a clear liquid. The diver is weighted for near-neutral buoyancy. The upper portion of the column is shaded, and the lower portion is subjected to thermal radiation such as sunlight. When radiation strikes the diver, it heats the gas, thereby increasing the gas volume, displacing liquid and increasing the buoyancy of the diver. The diver therefore rises to the shaded region where the gas cools, causing the diver to sink. The cycle repeats.

DESCRIPTION OF THE DRAWINGS

The nature, advantages and various additional features of the invention can be better understood by consideration of the illustrative embodiments described in connection with the following drawings. In the drawings:

FIGS. 1A, 1B illustrate an idealized diving device;

FIGS. 9A and 9B are front and side views of a fourth alternative diver.

Figure 2C:
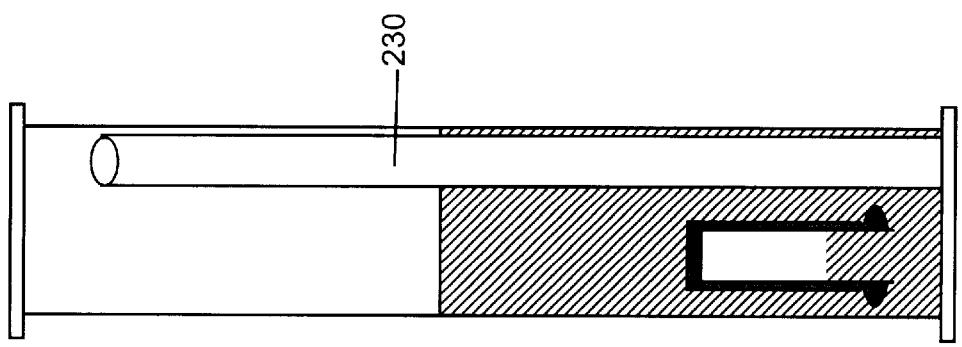
FIGS. 2A and 2B and 2C show preferred embodiments of diving devices.

It should be understood that the drawings are to illustrate the concepts of the invention and are not to scale.

DETAILED DESCRIPTION

Applicant's diving device is designed to be operated by changing heat, rather than by changing barometric pressure. Instead of reacting to external pressure modulations, it harnesses the energy of a heat source, such as the sun, to cyclically raise and lower the diver. One can think of it as a very simple pump, with a single moving part and no valves or linkages.

Referring to the drawings, FIGS. 1A and 1B show a diving device 100 in accordance with a first embodiment of the invention. A transparent tube 120 suitable for enclosing a liquid is disposed in a vertical position and at least partially filled with clear liquid 110, such as mineral oil. A diver 101 in the form of a hollow body containing gas is immersed in the clear liquid. The amount of air in the diver is chosen so that the diver just floats above the bottom surface of tube 120. The diver is provided with a heat absorber, such as black glass walls, and a heat source such as shaded sunlight is provided for selectively heating the diver in the lower portion of the tube.

In operation, light from the sun 130 strikes the apparatus 100. Some of the light 131 is absorbed by shield 140. Some of the light 132 passes through the clear liquid. And some of the light 133 is absorbed by the black glass surface of the diver 101. This energy heats the air within the diver, raising its pressure. The higher pressure air squeezes some of the water out of the diver, and the diver rises to the top of the liquid as shown in FIG. 1B. In this position, the diver is shielded from the sun, and cools. The air pressure in the diver returns to its original, lower value, and the diver sinks once again to the bottom of the tube 120 as shown in FIG. 1A.

Figure 2B:
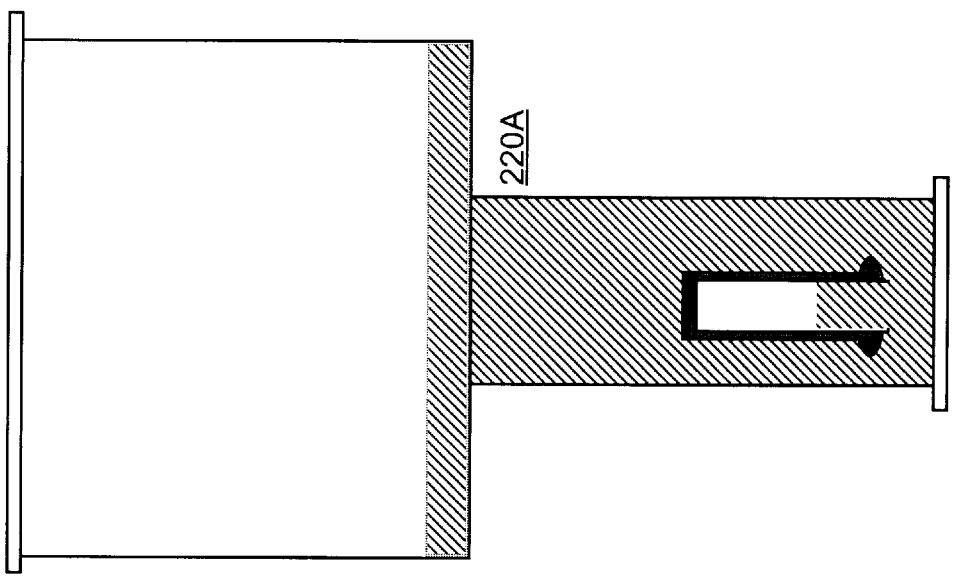
Figure 2A:
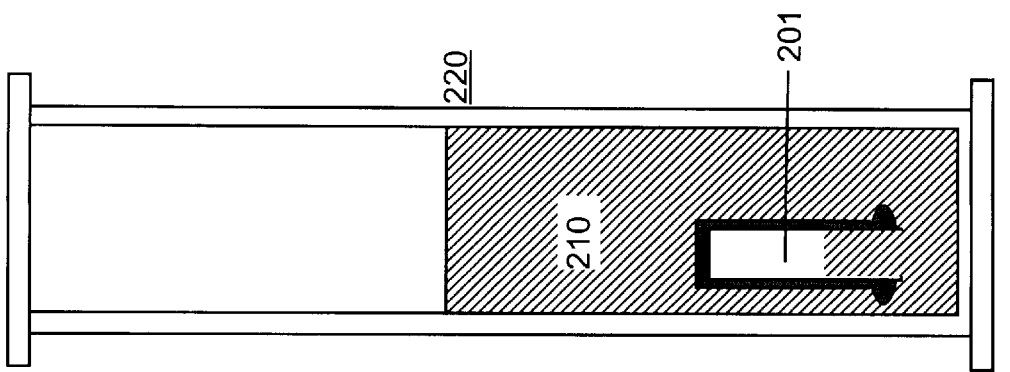

While the above idealized structure will produce a number of cycles of diving, many more cycles and even continuous operation can be achieved by using the preferred embodiments shown in FIGS. 2A, 2B and 2C.

In the FIG. 2A embodiment, the transparent tube 220 is well-insulated. For example, it is made of thick, low thermal conductivity plastic such as polycarbonate or a double-walled glass tube. The objective is to keep heat within the tube so that liquid and the air above the liquid will stay close in temperature. If the liquid heats too much above the air temperature, it may heat the air in the diver 201 to the point where the diver, even shielded from the heat source, is too buoyant to descend.

A second advantageous feature of the FIG. 2A embodiment is that no more than about 60% of the tube volume is filled with liquid 210. The advantage of this partial filling is that it prevents large fluctuations in the pressure of the air above the liquid. As the liquid heats, it expands, confining the air above to a reduced volume. This, in turn, increases pressure in the tube against the air in the diver. If the tube is nearly filled with the liquid, these pressure increases can dominate the thermally-induced pressure increases in the diver and prevent the diver from rising.

In the FIG. 2B embodiment the tube 220 has an enlarged section 220A at the liquid/air interface. This expands the surface area of the air exposed to the liquid, thereby increasing the efficiency of the thermal transfer so that the air and liquid will be close in temperature.

In the FIG. 2C embodiment, an internal heat radiator, such as a metal rod 230, extends between the liquid and the gas, ensuring thermal equilibrium.

Figure 3B:
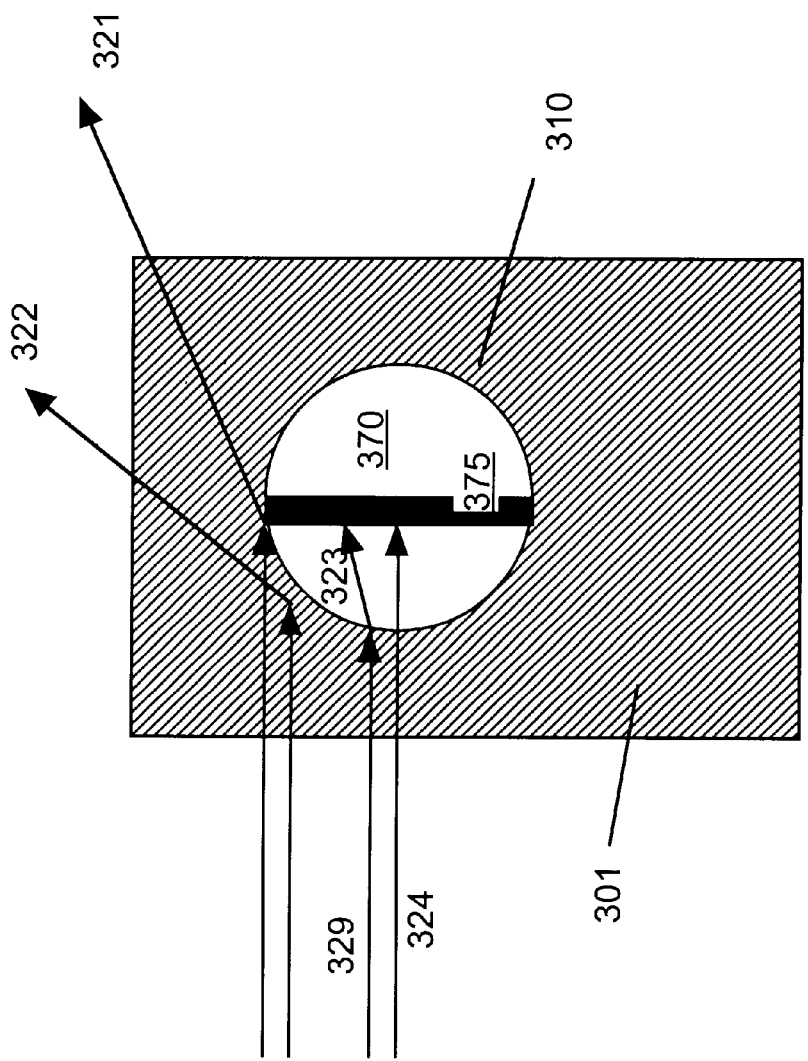
FIG. 3 illustrates a preferred form for the diver.
Figure 3A:
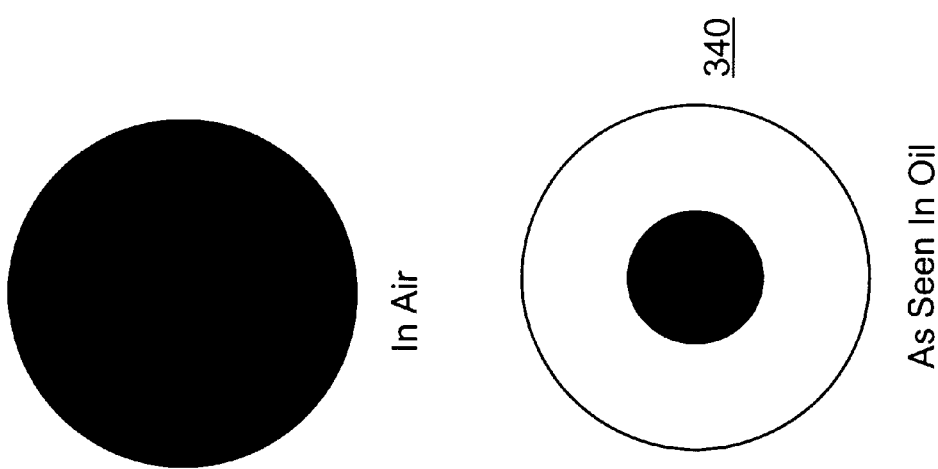

FIGS. 3 illustrates a preferred form for the diver. The diver 310 is made of a clear material, such as clear plastic, and absorbing material, such as a black sheet of metal 370, is disposed within the gas entrapped within the diver. The advantage of this embodiment is that most of the heat absorbed by sheet 370 will be effective to heat the entrapped air. In contrast, for a black glass diver most of the heat absorbed by the black glass would be immediately transferred to the liquid.

Alternatively the diver can be made of insulating material, such as low conductivity plastic, having absorbing material such as black paint on its interior walls. The advantage is that much of the absorbed radiation heats the enclosed gas.

In designing a diver with an interior absorbing element, one must take care to avoid too great a loss of thermal radiation by total internal reflection. Light 329 traveling from a high index oil 301 will bend steeply away from the incident direction due to the low index of air. At a critical angle, the light 322 is fully reflected. So where a black sheet of metal is mounted at the center of a clear glass sphere, rays 321, 322 are reflected, while rays 323, 324 pass into the air and strike the sheet. Viewed from the direction of the light, the diver 340 appears to be a silver donut with a black center. Almost 75% of the incident light is wasted, mitigating much of the advantage of an interior black sheet.

Figure 4:
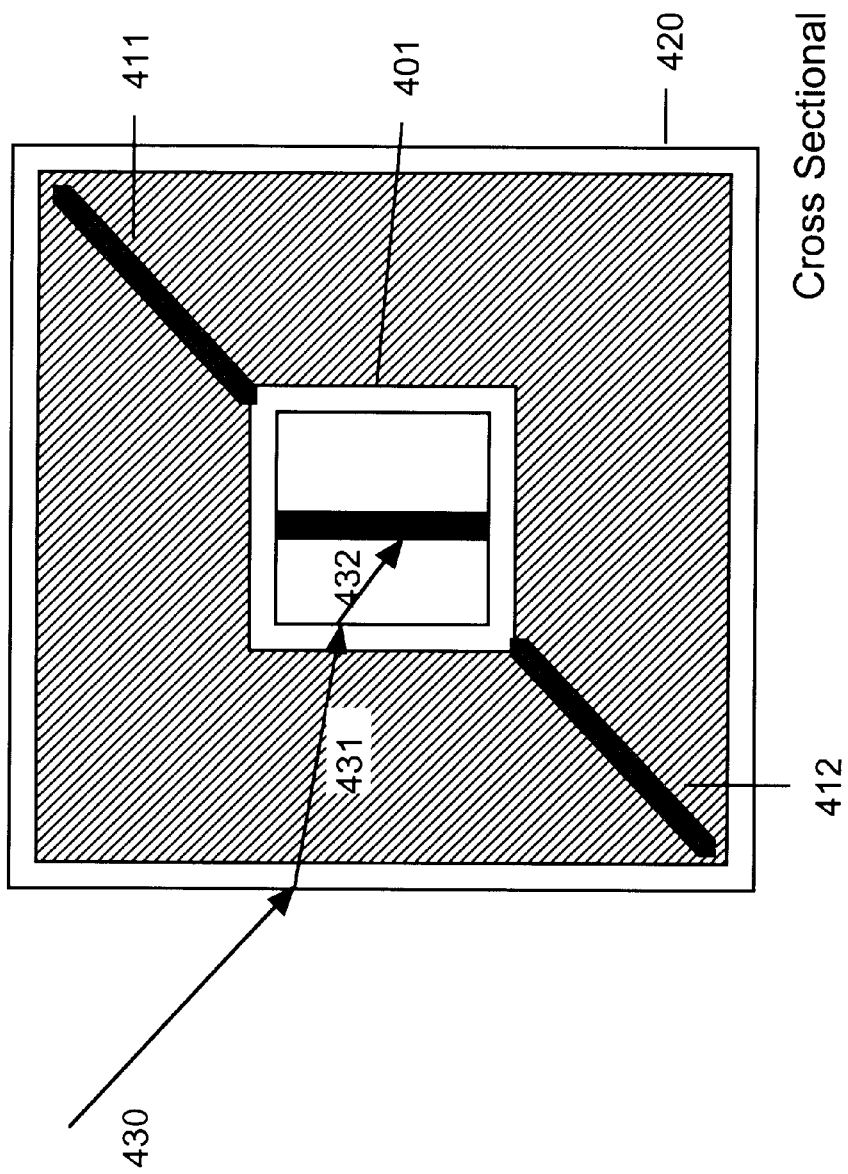
FIGS. 4 shows an alternative diver.

FIG. 4 illustrates a more sophisticated form of the FIG. 3 diver. Here the diver 401 is in the shape of a rectangular box. Tube 420 is also rectangular, and guides, such as small pins 411, 412, are used to keep the faces of diver 401 parallel to the faces of tube 420.

The advantage of the FIG. 4 embodiment is that it minimizes total internal reflection from the faces of the diver. In operation, light ray 430 strikes one face of tube 420. Since the index of refraction of the tube and the liquid are larger than air, the ray 431 bends towards a direction normal to the tube face. This ray 431 passes through the liquid to the diver. When it passes into the diver, the ray 432 bends away from the normal by exactly the same amount as it previously bent inward. By well-known laws of optics, rays 430 and 432 are parallel. Through this mechanism, every ray incident on the diver can be absorbed.

Figure 5:
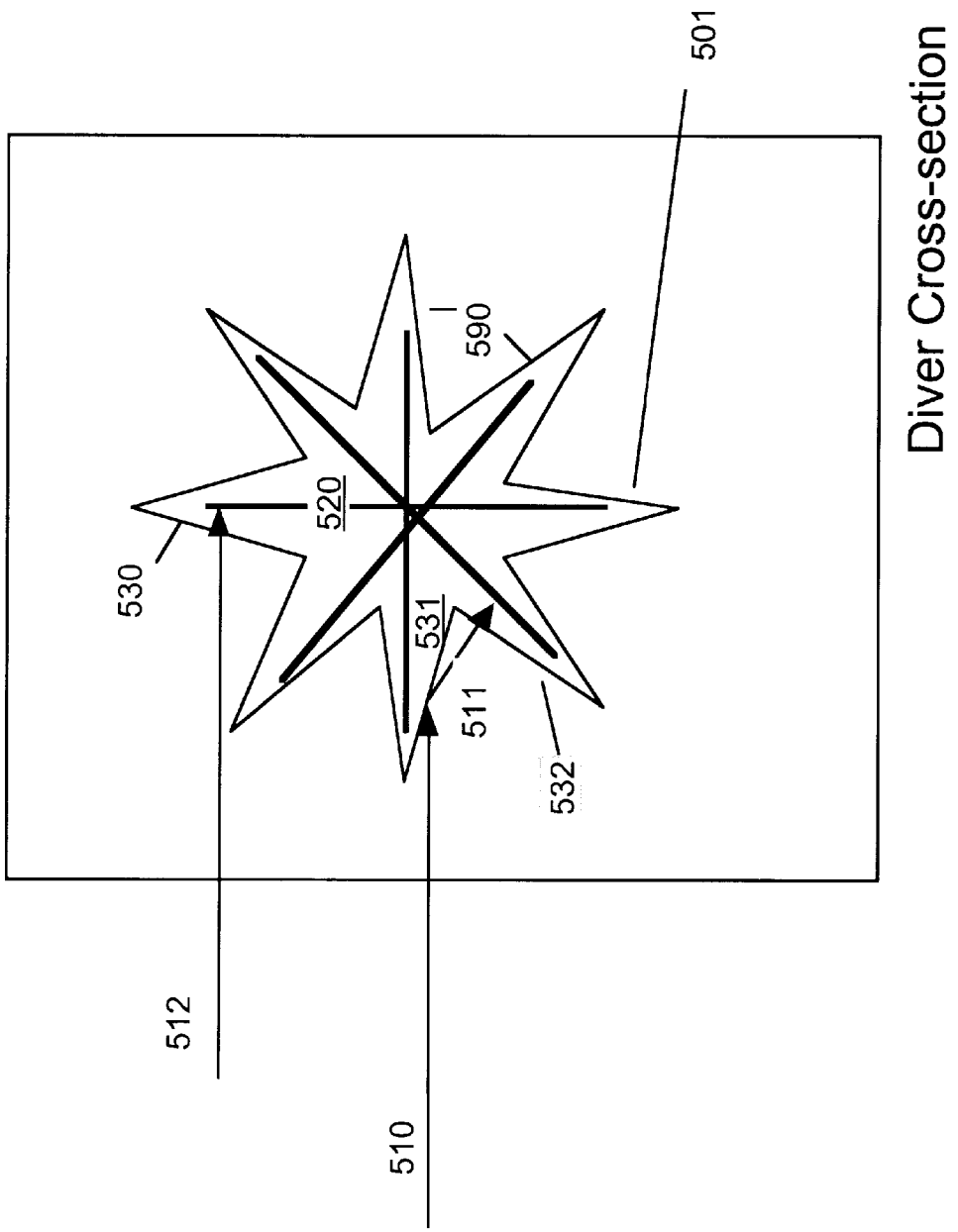
FIGS. 5 illustrates a third alternative diver.

A second approach to minimizing total internal reflection shown in FIG. 5 is to steeply angle the faces of diver 501. When rays 512 approach a facet 530 at near-normal incidence, they enter the diver with only a small angle change and are absorbed in absorber 520. A ray 510 which approaches the facet 531 at an oblique angle is totally reflected at the surface. But the reflected ray 511 encounters facet 532 at a near-normal angle, and thus it can enter the diver. For this approach to be effective, the angle 590 between adjacent facets must be less than the critical angle for total internal reflection.

Figure 6B:
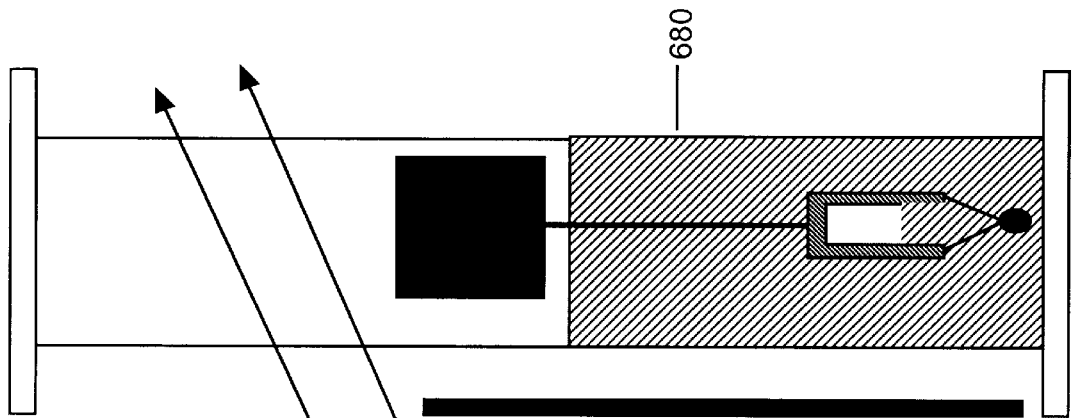
FIG. 6 shows an alternative diving device powered by heating the air above the diver.
Figure 6A:
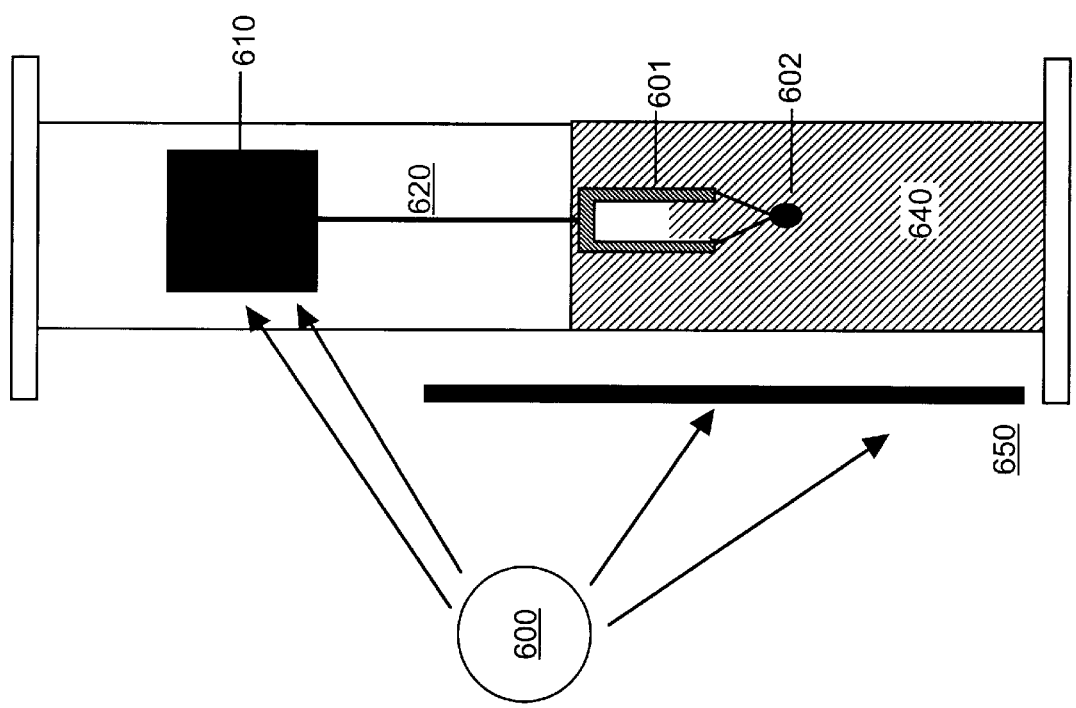

It is also possible to build a diver where the air above the oil is heated, rather than the air inside the diver. FIG. 6 illustrates this variation. Black sheet 610 (i.e. the "flag") is connected to diver 601 via thin rod 620. Diver 601 is counterbalanced by weight 602 to assure the center of mass is below the center of buoyancy, and adjusted to float at the top of liquid 640. Sun 600 strikes black sheet 610 in the air above the oil. This heats the air, raising its pressure, and thus forces diver 601 to sink. The sinking of the diver 601 drops black sheet 610 behind solar shield 650. Once the black sheet is removed from intercepting rays 651, 652 of sun 600, the air in tube 680 cools and the diver rises.

The diver-with-flag design has the advantages of a large surface area to intercept sun light, it avoids the need for either an infrared transparent oil or special considerations to eliminate total internal reflection, and its motions are visible from across a room. However, if a thick walled tube is used, the low thermal conductivity will slow the cycle time down.

Figure 7A:
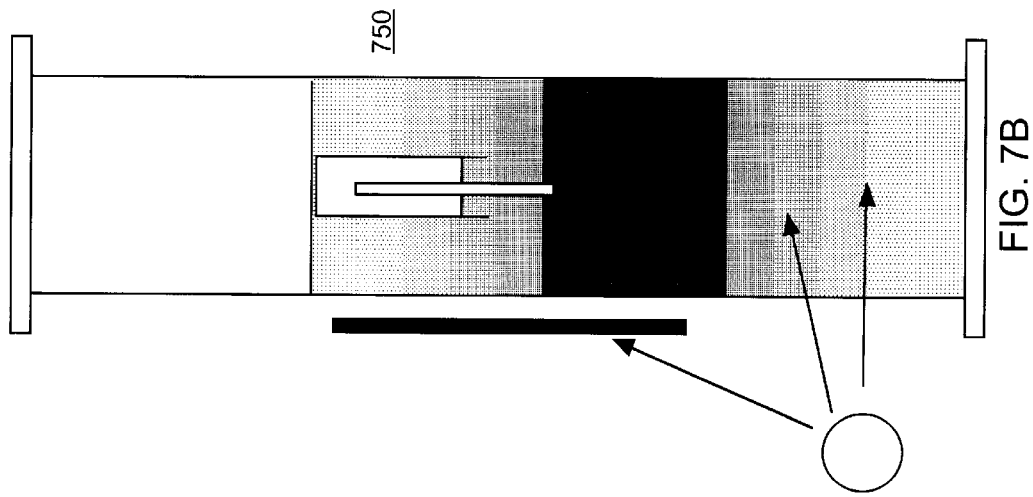
FIG. 7 illustrates a two layer liquid diving device.
Figure 7B:
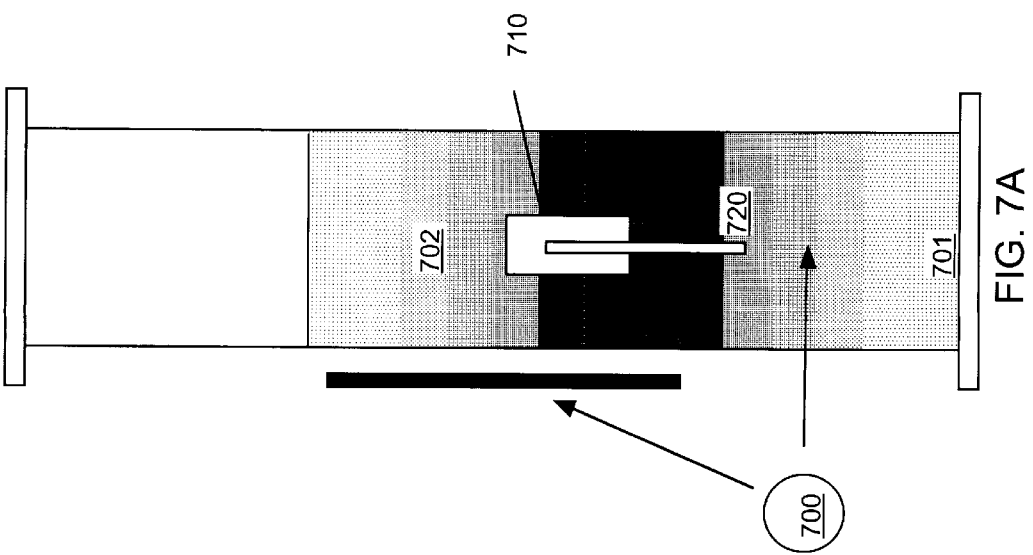

FIG. 7 illustrates a two layer liquid diver. Oil and water are immiscible. So, the column can be filled with water in the bottom fourth of the tube, oil floating on the water as the next fourth, and the remaining portion of the tube filled with air.

The diver 710 is clear, and contains a metal rod 720 mounted in the center. This rod functions both as the counterweight and as a thermal guide.

Sun 700 strikes the lower water layer 701. Either because water is an efficient absorber of infrared, or because the water is dyed black, or because it contains a black metal film, the water rapidly heats. However, although heat can diffuse from water 701 to oil 702, it cannot convect because they are immiscible. Convection is a much more efficient way to transmit heat than diffusion, so a thermal gradient appears between water 701 and oil 702. This gradient is shown in the drawing by the darkness of the oil and water. The temperature is highest in the water right at the water/oil interface. Measurements in light simulating "one sun" easily achieves 20° C. temperature gradient.

The diver 710 is filled with just enough air to float the at the water/oil interface with the end of the rod penetrating the water. The good thermal conductivity of the rod carries heat from the water to the air in the diver (the sides of the rod may be insulated to reduce heat losses to the oil). This causes the diver to rise to position 750, where it cools and falls.

Compared to the solar diver described in earlier embodiment, where sunlight is absorbed within the diver, this device is much slower to begin operation, because the entire column of fluid must first be heated. On the other hand, it will continue to function when the sun is temporarily shielded by clouds.

Figure 8B:
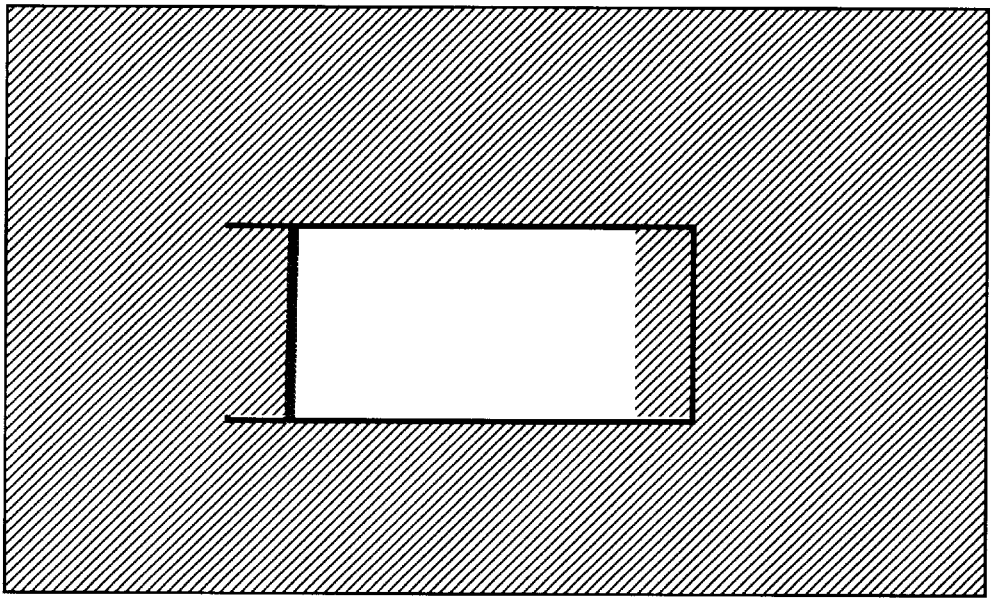
FIGS. 8A and 8B illustrate a robust diving device for transportation.
Figure 8A:
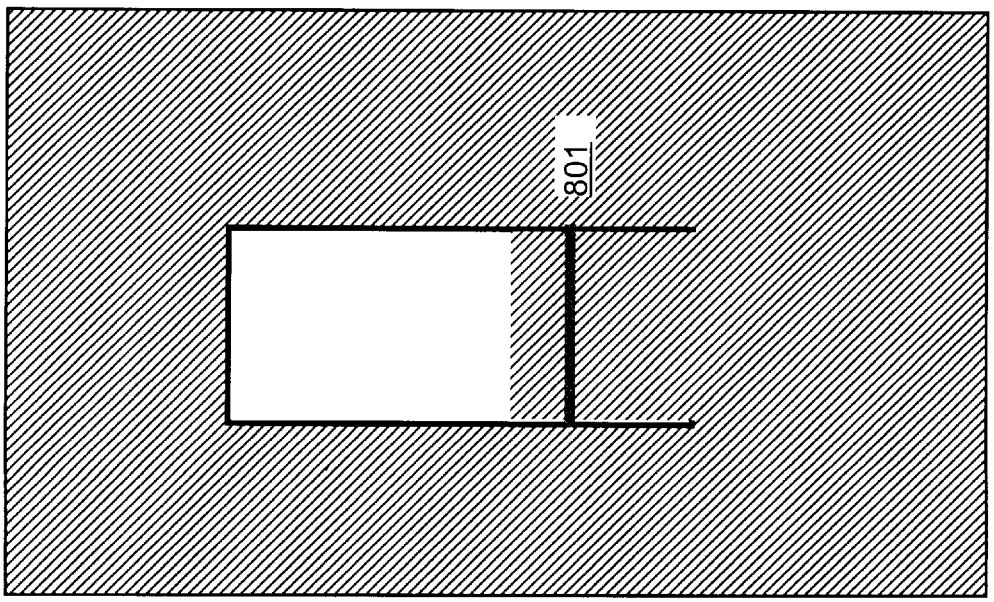

FIGS. 8A and 8B illustrate an alternative diver which is robust for transportation. Although it is possible to specify that a completed solar diver must be shipped in a vertical position (so the air stays trapped in the diver), this is expensive and prone to simple errors, ruining a shipment. However, if as shown in FIG. 8A a sheet of fine mesh screen 801 is placed within the diver, the high surface tension of oil to air will prevent air from leaking past the screen, even when inverted as in 8B. However, in its operating position 8A, the screen is covered with oil on both sides, and thus there is no surface tension difference to impede oil from moving in response to pressure changes.

FIG. 9A is a side view of another alternative diver in the form of an inflated transparent plastic bag 90 containing a thermal absorbing body 91 which can include an absorbing surface 92 (painted black) and a decorative surface 93. A weight 94 can be attached to the bag to obtain a level of buoyancy for cyclic diving. FIG. 9B is a front view of the diver showing an exemplary decorative surface 92.

It is to be understood that the above described embodiments are illustrative of only a few of the many possible specific embodiments which can represent applications of the principles of the invention. For example, the diver's motion can be used to ring a chime, turn a pulley and lift an object. Whimsical diver shapes such as a fish, squid, octopus or even an elevator can be used. Moreover the device can be visually enhanced by adding colored or reflective neutrally buoyant particles to the liquid. Thus numerous and varied arrangements can be readily devised by those skilled in the art without departing from the spirit and scope of the invention.

What is claimed:

1. A thermally-powered diving device for diving up and down in response to thermal radiation comprising:
   - a transparent tube adapted for retaining liquid and gas above said liquid, said tube disposed in a vertical position in operation, thereby defining a lower portion and an upper portion,
   - a transparent liquid partially filling said tube; and
   - a diver comprising a hollow body of solid material at least partially filled with gas and including a heat absorbing material, said diver disposed in said liquid, whereby when said diver is in the lower portion of said tube exposed to thermal radiation, heating the gas within said diver will cause said diver to rise toward the upper portion; and
   - a shield shading the upper portion of said tube from thermal radiation, whereby when said diver is in the upper part of said tube, cooling the gas within said diver will cause said diver to drop toward the lower portion.

2. The device of claim 1 wherein said heat absorbing material comprises a heat-absorbing body.

3. The device of claim 1 wherein said tube is thermally insulated so that the liquid and gas above it are close in temperature to permit said diver to descend from the upper portion.

4. The device of claim 1 wherein said liquid fills no more than 60% of the volume of said tube.

5. The device of claim 1 wherein a heat radiator extends between the liquid and the gas so that the liquid and gas are close in temperature to permit said diver to descend from the upper portion.

6. The device of claim 1 wherein said diver has insulating walls including heat absorbing material on its inner surfaces.

7. The device of claim 1 wherein said diver comprises a rectangular box to minimize total internal reflection.

8. The device of claim 1 wherein said diver comprises a sheet of mesh screen to prevent escape of enclosed gas when said device is inverted.

9. The device of claim 1 wherein said hollow body comprises a transparent plastic bag.

10. A thermally-powered diving device comprising:
    - a closed transparent tube adapted for retaining liquid and gas above said liquid, said tube disposed in a vertical position in operation, thereby defining a lower portion and an upper portion;
    - a transparent liquid partially filling said tube,
    - a diver comprising a hollow body at least partially filled with gas, said diver including a heat absorbing portion extending into the gas above said liquid, whereby heating of said gas above said liquid in said tube will cause said diver to descend toward the lower portion.

11. A thermally-powered diving device comprising:
    - a transparent tube adapted for retaining liquid and gas above said liquid, said tube disposed in a vertical position in operation, thereby defining a lower portion and an upper portion,
    - at least two immiscable liquids partially filling said tube, the one liquid having greater thermal absorption than the other for creating a thermal gradient between the two liquids; and
    - a diver comprising a hollow body of solid material at least partially filled with gas, said diver including a thermally conductive portion for extending between two liquids, whereby a temperature difference between the two liquids will heat or cool said gas to cause said diver to rise and fall.

* * * * *